United States Patent
Abe et al.

(10) Patent No.: US 7,326,492 B2
(45) Date of Patent: Feb. 5, 2008

(54) LAMINATE SHEET, LAMINATE BATTERY AND RELATED METHOD

(75) Inventors: Takaaki Abe, Yokosuka (JP); Takanori Ito, Zushi (JP); Osamu Shimamura, Yokohama (JP); Takamitsu Saito, Yokohama (JP); Hideaki Horie, Yokosuka (JP); Hiroshi Sugawara, Yokosuka (JP); Yukinori Takahashi, Yokosuka (JP); Masaaki Suzuki, Yokosuka (JP); Kenji Hamada, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 370 days.

(21) Appl. No.: 10/659,257

(22) Filed: Sep. 11, 2003

(65) Prior Publication Data

US 2004/0062983 A1  Apr. 1, 2004

(30) Foreign Application Priority Data

Sep. 26, 2002 (JP) .......................... P2002-281355

(51) Int. Cl.
*H01M 6/12* (2006.01)
*H01M 2/04* (2006.01)
*H01M 2/02* (2006.01)
*H01M 4/82* (2006.01)

(52) U.S. Cl. .................. 429/162; 429/176; 429/181; 29/623.4

(58) Field of Classification Search ............ None
See application file for complete search history.

(56) References Cited

U.S. PATENT DOCUMENTS 6,395,420 B1  5/2002  Komatsu

| 6,632,538 | B1 * | 10/2003 | Yamazaki et al. | 428/461 |
| 6,692,866 | B2 * | 2/2004 | Watanabe et al. | 429/129 |
| 2001/0038938 | A1 * | 11/2001 | Takahashi et al. | 429/53 |

FOREIGN PATENT DOCUMENTS

| EP | 1 047 137 A2 | 10/2000 |
| JP | 10-289698 | 10/1998 |
| JP | P2000-200585 A | 7/2000 |
| JP | 2000-277093 | 10/2000 |
| JP | 2000277093 A * | 10/2000 |
| JP | 2001-345090 A | 12/2001 |
| JP | 2002-151024 | 5/2002 |
| JP | 2002-170532 A | 6/2002 |

OTHER PUBLICATIONS

European Search Report issued in corresponding European Patent Application No. EP 03 01 9305, dated Oct. 13, 2006.

* cited by examiner

Primary Examiner—Patrick Joseph Ryan
Assistant Examiner—Karie O'Neill
(74) Attorney, Agent, or Firm—McDermott Will & Emery LLP (57) ABSTRACT

A laminate battery is provided with a tab, an electric power generating element connected to the tab, and a laminate sheet allowing the electric power generating element to be accommodated. The laminate sheet includes a metallic layer and a thermally welding resin layer laminated on the metallic layer. The tab and the thermally welding resin layer are welded by permitting a thermally welding area, which is formed in at least one of the thermally welding resin layer and the tab, and the other of the thermally welding resin layer and the tab to be welded to one another.

12 Claims, 7 Drawing Sheets

LAMINATE SHEET, LAMINATE BATTERY AND RELATED METHOD

BACKGROUND OF THE INVENTION

The present invention relates to a laminate sheet, a laminate battery and a related method and, more particularly, to a laminate sheet, a laminate battery and a related manufacturing method that ensure adhesive property through adjustment of a thickness of a thermally welding resin layer.

Recently, diligent research and development work has been undertaken in the recent years to provide a motor drive battery with a view to actually commercializing an electric vehicle (EV), a hybrid vehicle (HEV) and a fuel cell powered vehicle (FCV). As the motor drive battery, it has been proposed to use a secondary battery that is enabled to achieve charging in repeated cycles.

The secondary battery, which has been heretofore proposed, includes a can type battery with a structure wherein a battery element is accommodated inside a can, and a laminate battery with a structure wherein the battery element is hermetically sealed in a laminate sheet. As a power supply for a moving object such as an automobile, the laminate battery is preferably used that is available for lightness in weight and compactness in size.

Japanese Patent Application Laid-Open Publication No. 2000-200585 discloses a technology wherein, in order to improve a characteristic of a laminate battery, a sealing portion is folded to reduce a surface area occupied by such a sealed portion. Namely, by permitting the sealed portion having a sufficient width to be bent, attempt has been made to achieve improvement in reliability and a volumetric energy density of the battery.

SUMMARY OF THE INVENTION

Now, according to studies conducted by the present inventors, the battery element of the laminate battery is hermetically sealed inside the laminate sheet by thermally welding the laminate sheet. In this instance, tabs attached to the battery element are taken out to an outside of the laminate sheet so as to allow the tabs to be pulled out to the battery outside during manufacturing thereof. Accordingly, two sheets of laminate sheets are thermally welded at an area where the tab is present to allow the tab to be sandwiched. In a case where the laminate sheet is comprised of a polymer and metal composite film, wherein a thermally welding resin layer, a metallic layer and a resin layer having a high rigidity are laminated in this order, a laminated structure in the tab portion of a completed battery takes the form of a structure wherein one resin layer having a high rigidity, one metallic layer, one thermally welding layer, the tab, the other thermally welding resin layer, the other metallic layer and the other resin layer having a high rigidity are laminated in such an order.

However, during sealing of the battery element, the thermally welding resin layer is melted. Consequently, at the area where the tab is present, thermally welding resin is apt to be pushed out in a volume corresponding to that occupied by the tab. As a result, the thickness of the thermally welding resin layer at the area where the tab is present tends to be thinner than the original thickness. That is, due to the presence of the thinned thickness of the thermally welding resin layer, the tab and the metallic layer tends to necessarily become closer to one another in distance, and it is conceivable for a probability to occur in which the metallic layer and the tab are brought into contact.

In order for the distance between the tab and the metallic layer to be ensured, the thickness of the thermally welding resin layer may be preliminarily ensured to have an adequate value. However, the existence of the increased thickness of the thermally welding resin layer means that the volumetric energy density of the laminate battery is degraded. It is preferable to avoid such degradation of the battery characteristic, caused by such an outer sheath material, as less as possible.

Further, the presence of thinned thickness of the tab makes it possible to ensure the distance between the tab and the metallic layer. However, the presence of the thinned thickness of the tab results in an increase in electrical resistance of the tab and, therefore, it becomes hard to avoid the battery characteristic from being degraded.

The present invention has been completed with the above studies undertaken by the present inventors and has an object to provide a laminate sheet, a laminate battery and a related method that enable a distance between a tab and a metallic layer of a laminate sheet to be ensured and, also, enable degradation of a battery characteristic of the laminate battery to be suppressed to a minimal extent.

To achieve such an object, according to one aspect of the present invention, a battery packaging laminate sheet comprises: a metallic layer; and a thermally welding resin layer laminated on the metallic layer and having a portion to be thermally welded, the portion to be thermally welded having a partial area with which a tab of a battery using a battery packaging laminate sheet is thermally welded, and the partial area having a thickness larger than a thickness of a remaining area of the portion to be thermally welded.

Further, according to another aspect of the present invention, a battery element sealed inside a laminate sheet provided with a thermally welding resin layer and a metallic layer laminated thereon, comprises: an electric power generating element; and a tab formed with a thermally welding resin layer which is thermally welded with a thermally welding resin layer of a laminate sheet and connected to the electric power generating element.

Furthermore, according to another aspect of the present invention, a laminate battery comprises: a tab; an electric power generating element connected to the tab; and a laminate sheet allowing the electric power generating element to be accommodated and having: a metallic layer; and a thermally welding resin layer laminated on the metallic layer, wherein the tab and the thermally welding resin layer are welded by permitting a thermally welding area, which is formed in at least one of the thermally welding resin layer and the tab, and the other of the thermally welding resin layer and the tab to be welded to one another.

Meanwhile, according to the present invention, a method of manufacturing a laminate battery, comprises: preparing a tab and an electric power generating element connected to the tab; preparing a laminate sheet having a metallic layer and a thermally welding resin layer laminated on the metallic layer; and welding the tab and the thermally welding resin layer, such that a thermally welding area formed in at least one of the thermally welding layer and the tab is welded to the other of the thermally welding layer and the tab, while permitting the electric power generating element to be accommodated in the laminate sheet.

Other and further features, advantages, and benefits of the present invention will become more apparent from the following description taken in conjunction with the following drawings.

DETAILED DESCRIPTION OF THE PREFERRED EMBODIMENTS

Hereinafter, a laminate sheet, a laminate battery and a related method of each of embodiments according to the present invention are described below with suitable reference to the attached drawings.

First Embodiment

First, a laminate sheet, a laminate battery and a related method of a first embodiment according to the present invention are described in detail with reference to FIGS. 1 to 5.

Figure 1:
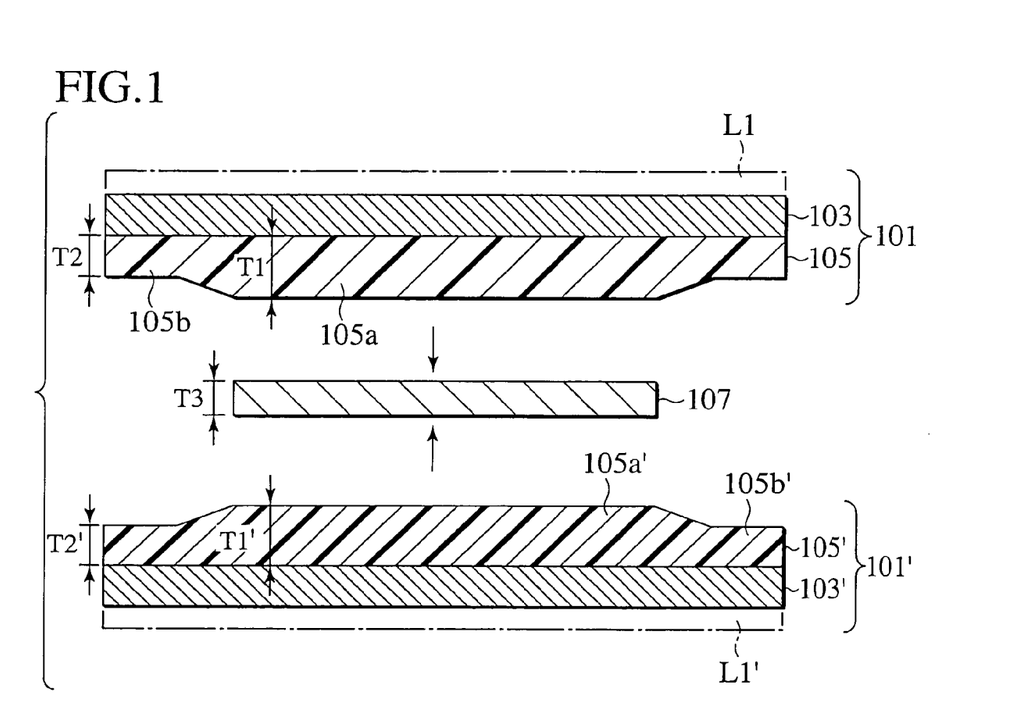
FIG. 1 is a cross sectional view illustrating the positional relationship between a laminate sheet and a tab to be disposed in a laminate battery of a first embodiment according to the present invention.

FIG. 1 is a cross sectional view illustrating a positional relationship between laminate sheets 101, 101', which is for packaging a battery, and a tab 107 to be disposed, in the presently filed embodiment. Also, such laminate sheets 101, 101' may be composed of two laminate sheets or may be composed of one laminate sheet that is folded to provide a cross sectional structure with the laminate sheets 101, 101' having similar configurations even if two laminate sheets or one folded laminate sheet are used.

As shown in FIG. 1, the laminate sheets 101, 101' of the presently filed embodiment have structures wherein thermally welding resin layers 105, 105' and metallic layers 103, 103' are laminated, respectively.

More particularly, the laminate sheets 101, 101' of the presently filed embodiment are structured such that thickness T1, T1' of areas of thermally welding resin layers 105a, 105a', where the tab 107, to be taken out to the outside of the battery, is welded, are larger than thickness T2, T2' of thermally welding resin layers 105b, 105b' at areas where the tab 107 is not welded. Here, the tab 107 represents either one of a positive electrode or a negative electrode, and such a structure similarly applies to the other tab.

That is, in the thermally welding resin layers 105, 105' of the laminate sheets 101, 101', the thermally welding resin layers 105a, 105a', corresponding to areas in which the tab 107 is welded, have the thickness T1, T1' larger than the thickness T2, T2' of the thermally welding resin layers 105b, 105b' corresponding to areas where the tab 107 is not welded. Here, the thermally welding resin layers 105a, 105a' that corresponds to the areas where the tab 107 is welded represent areas of the thermally welding resin layers 105, 105', on the surfaces of which the tab 107 is disposed and at which the tab 107 is welded thorough a step in which a laminate battery 109 is formed by using thermal welding. Further, the thermally welding resin layers 105b, 105b' that correspond to the areas where the tab 107 is not welded represent areas of the thermally welding resin layers 105, 105', on the surfaces of which the tab 107 is not disposed and at which the thermally welding resin layers 105, 105' are welded to one another thorough the step in which the laminate battery 109 is formed by using thermal welding. Moreover, the thermally welding resin layers 105, 105', corresponding to the areas to which the tab 107 is welded, are connected to the thermally welding resin layers 105b, 105b', corresponding to the areas to which the tab 107 is not welded, in gradually sloped configurations taking the thickness of each of the metallic layers 103, 103' and the tab 107.

Also, although the laminate sheets 101, 101', as shown in FIG. 1 and following drawings, are described in connection with an exemplary case in such a manner that the laminate sheets are comprised of a structure in which the metallic layers 103, 103' and the thermally welding resin layers 105, 105' are only laminated for the sake of convenience of description, the presently filed embodiment is not limited to such an exemplary structure. In actual practice, with a view to enhancing mechanical strengths of the laminate sheets 101, 101', resin layers L1, L1', each having a high rigidity, may be disposed over surfaces of the metallic layers 103, 103' opposite to the thermally welding resin layers 105, 105', as shown FIG. 1, or other layers may be suitably disposed.

Figure 2:
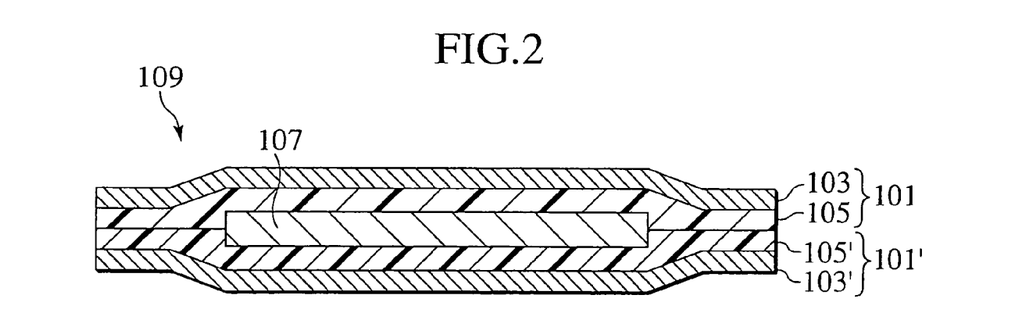
FIG. 2 is a cross sectional view of a laminate battery with the laminate sheet and the tab being thermally welded and corresponds to a cross section taken on line II-II of FIG. 3 in the first embodiment.

FIG. 2 is a cross sectional view of the laminate battery 109 that is formed by thermally welding the laminate sheets 101, 101' and the tab 107 which are arranged in layout shown in FIG. 1. Further, FIG. 3 shows a partial plan view of the laminate battery 109 shown in FIG. 2, and FIG. 2 is a cross sectional view of the laminate battery 109 taken on line II-II of FIG. 3.

Figure 3:
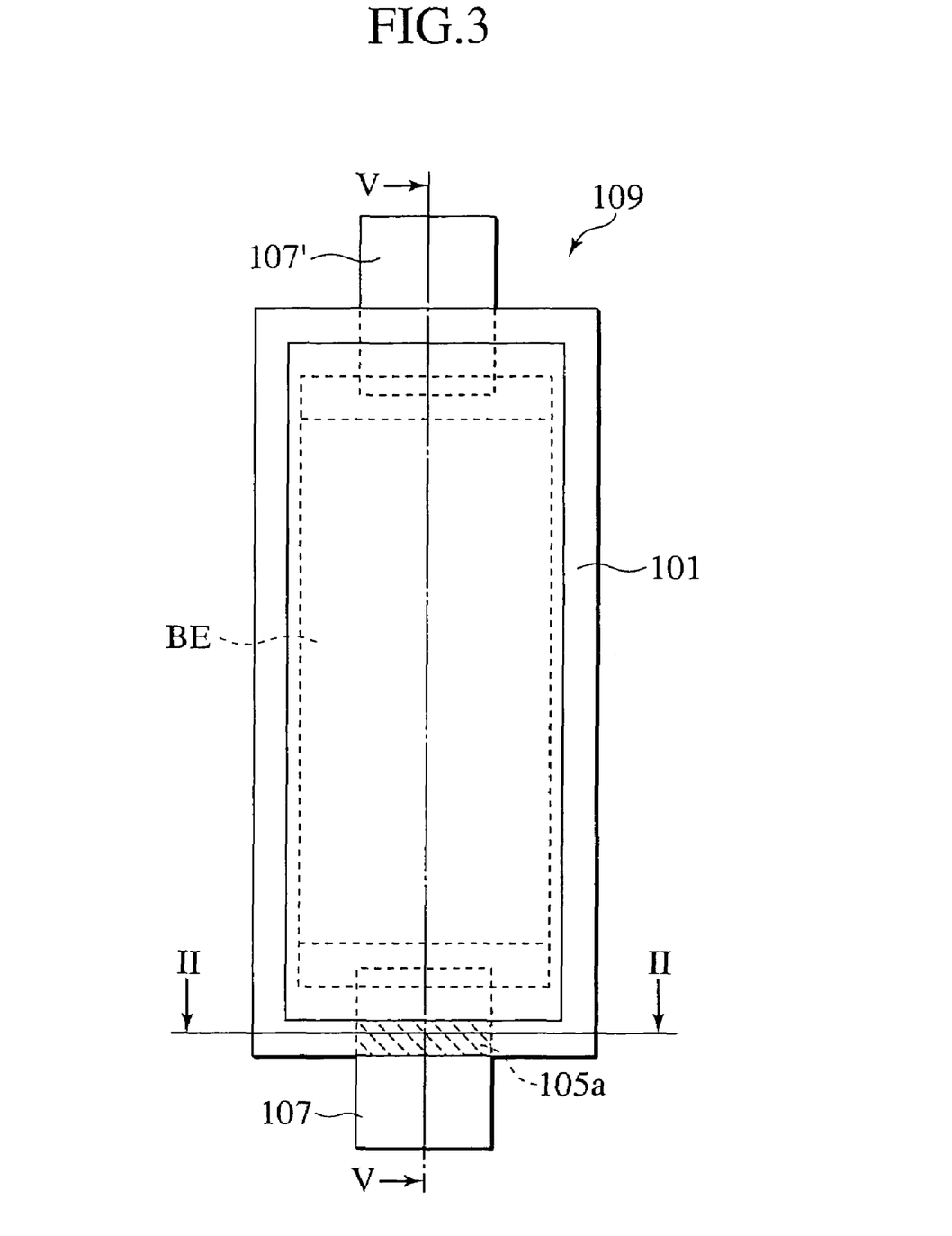
FIG. 3 is a partial plan view of the laminate battery of the first embodiment.

In FIGS. 2 and 3, the laminate battery 109 using the laminate sheets 101, 101' of the presently filed embodiment is constructed of a battery element BE, the laminate sheets 101, 101' by which the battery element BE is internally sealed, and the tabs 107, 107'. Also, even though a detail is described later, the battery element BE includes an electric power generating element composed of a positive electrode, an electrolyte, a negative electrode and the like. The tab 107 represents either one of the positive electrode and the negative electrode while the tab 107' represents the other one of the electrodes and, since the laminate sheets 101, 101' and the tab 107' are welded in the same structure as that of the laminate sheets 101, 101' and the tab 107, description is typically given with respect to the tab 107. Moreover, it is not objectionable for the battery element BE to be defined not only as the electric power generating element comprised of the positive electrode, the electrolyte and the negative electrode but also as the electric power generating element even further including the tabs 107, 107'.

Here, due to the presence of an increased thickness of the thermally welding resin layer 105a (shown in dotted slant lines in FIG. 3) corresponding to the area to which the tab 107 is welded, it becomes possible for the laminate battery 109, formed by using thermal welding, to ensure an adequate distance between the tab 107 and the metallic layers 103, 103'. For this reason, short-circuiting caused by contact between the tab 107 and the metallic layers 103, 103' can be avoided. Additionally, without the need for causing the tab 107 to be reduced in thickness to a value more than required or without causing the tab 107 not to be thinned at all, it becomes possible to enhance an adequate length in distance between the tab 107 and the metallic layers 103.

For this reason, the laminate battery 109 with such a structure is able to suppress degradation in a battery characteristic such as a volumetric energy density and a power output to a minimal extent. Also, since the thermally welding resin layers 105, 105' have the increased thickness only at the thermally welding resin layers 105a, 105a' that correspond to the areas to which the tab 107 is welded, the presence of an increase in thickness of a portion of the thermally welding resin layer 105 in such a way provides almost no probability of an increase in a volume of the laminate battery 109. Consequently, the volumetric energy density of the laminate battery 109 can be reduced by a minimal extent. Moreover, increased adhesive property is provided between the tab 107 and the laminate sheets 101, 101'.

More particularly, in FIG. 1, an incremental component of the thickness T1, T1' of the thermally welding resin layers 105a, 105a', corresponding to the areas to which the tab 107 is welded, with respect to the thickness T2, T2' of the thermally welding resin layers 105b, 105b', corresponding to the areas to which the tab 107 is not welded, is preferably selected to be equal to or greater than a half of the thickness T3 of the tab 107 (as expressed as $T1-T2 \geq \frac{1}{2} \times T3$, $T1'-T2' \geq \frac{1}{2} \times T3$). If such conditions are satisfied, the amount of resin, which would be pushed by the tab 107 to be forced to the outside of the laminate battery 109, of the thermally welding resin layers 105, 105' can be compensated and, in other word, the amount of resin that compensates the amount of resin that would be forced out in such a way can be provided to be sufficient for protecting the metallic layer 103 and the tab 107 from being brought into contact with one another. However, the presence of an excessive amount of increase in the thickness T1, T1' of the thermally welding resin layers 105a, 105a' corresponding to the areas to which the tab 107 is welded results in the degraded volumetric energy density of the laminate battery 109. In view of this respect, an incremental component in the thickness T1, T1' of the thermally welding resin layers 105a, 105a', corresponding to the areas to which the tab 107 is welded, with respect to the thickness T2, T2' of the thermally welding resin layers 105b, 105b', corresponding to the areas to which the tab 107 is not welded, is preferably selected to be equal to or less than the thickness T3 of the tab 107 (as expressed as $T1-T2 \leq T3$, $T1'-T2' \leq T3$). Incidentally, it may be considered that, in actual practice, T1 and T1' are equal to one another and T2 and T2' are equal to one another.

Next, description is given to a manufacturing method for obtaining the laminate sheet of the presently filed embodiment shown in FIG. 1 so as to increase the thickness T1, T1' of the thermally welding resin layers 105a, 105a' corresponding to the areas to which the tab 107 is welded.

Figure 4A:
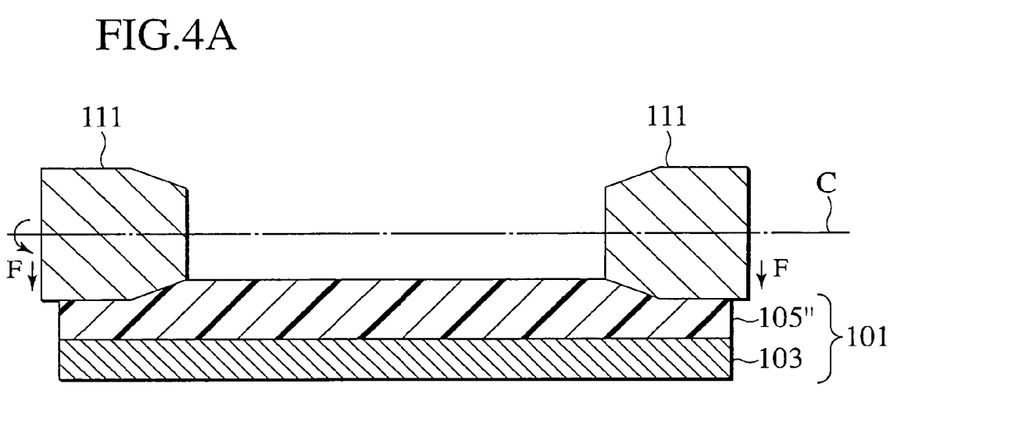
FIGS. 4A and 4B are views illustrating steps of adjusting a thickness of a thermally welding resin layer of the laminate battery by using a press roll in the first embodiment.
Figure 4B:
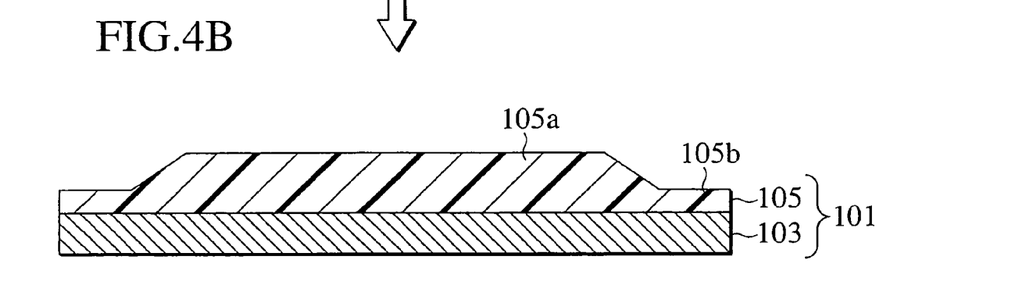

FIGS. 4A and 4B show steps of adjusting the thickness of the thermally welding resin layer 105, 105' using a press roll in the manufacturing method for obtaining the laminate sheet 101, 101' of the presently filed embodiment. Also, adjustment in thickness of the thermally welding resin layers 105, 105' is performed in the same way both for the laminate sheets 101, 101' and, hence, description is particularly given with respect to the laminate sheet 101.

As shown in FIG. 4A, the laminate sheet 101 with a thermally welding resin layer 105" preliminarily formed over the metallic layer 103 in a uniform thickness is prepared, and a press roll 111 rotational about a rotational axis C is placed on the thermally welding resin layer 105" formed in such a uniform thickness so as to exert a load F to the laminate sheet 101. That is, both ends of the thermally welding resin layer 105" are pressed by the press roll 111 and deformed in a manner, as shown in FIG. 4A.

Subsequently, under such a condition, the press roll 111 is rotated about the axis C while feeding the laminate sheet 101 along a path perpendicular to the plane of the paper sheet of FIG. 4A.

Then, the press roll 111 is acted upon the laminate sheet 101 at an entire area thereof and, after deformations in the both ends of the thermally welding resin layer 105" have been completed, the press roll 111 is separated away from the laminate sheet 101, thereby obtaining the laminate sheet 101 having the thermally welding resin layer 105a, corresponding to the area to which the tab 107 is welded, and the thermally welding resin layers 105b corresponding to the areas to which the tab 107 is not welded in a manner as shown in FIG. 4B. Of course, such a manufacturing method is not intended to be limited and a thermally welding resin layer having a given shape may be formed by pressing the thermal welding resin layer using a metallic body with a given surface configuration as a casting mold.

Figure 5:
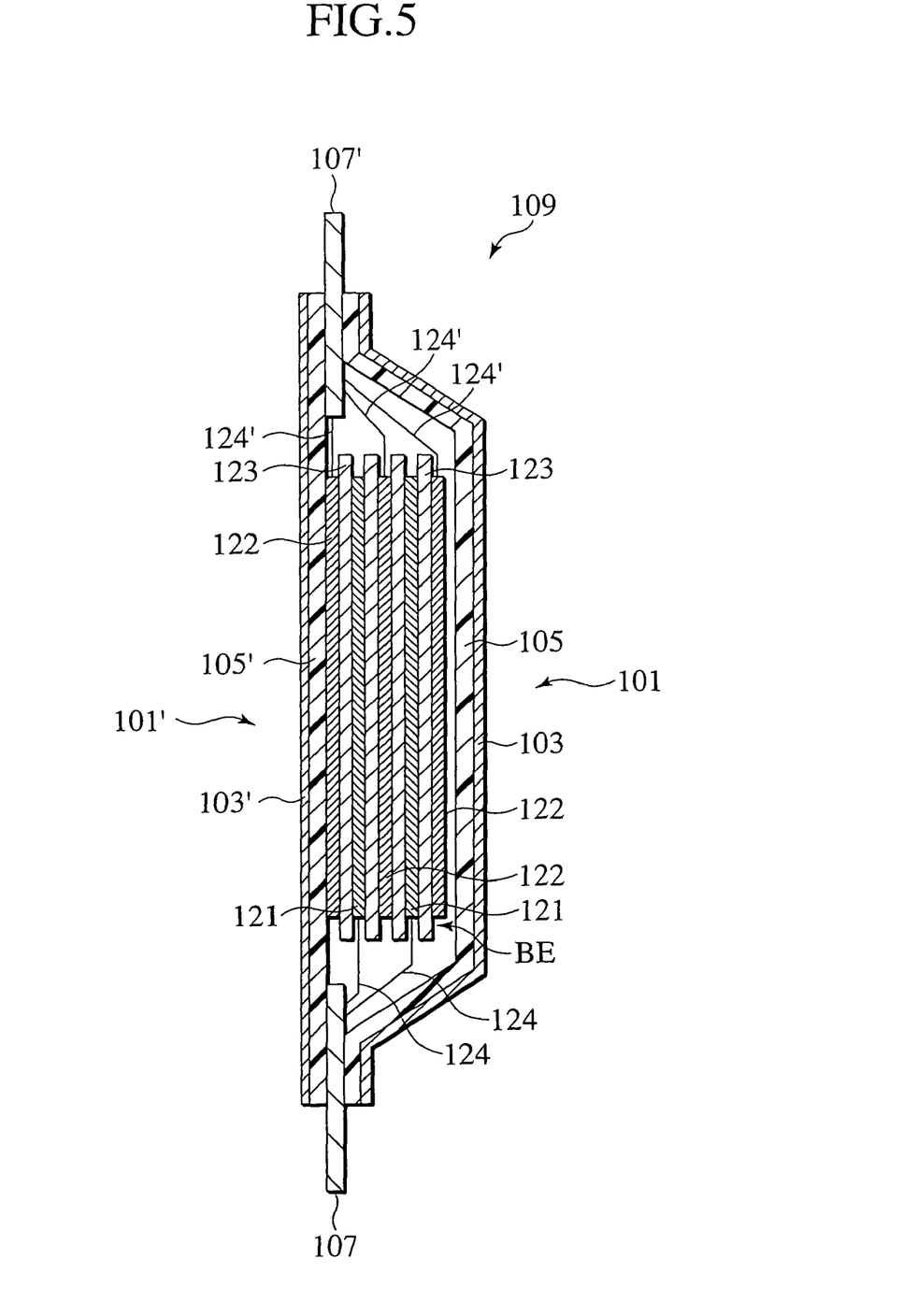
FIG. 5 is a cross sectional view of the laminate battery taken on line V-V of FIG. 3 in the first embodiment.

In the meantime, although no limitation is particularly intended for materials of the battery element BE, the thermally welding resin layers 105, 105' and the metallic layers 103, 103', a detailed description is representatively given hereinafter in conjunction with an exemplary case wherein the laminate battery 109 constitutes a lithium secondary battery (so called as a lithium ion secondary battery) with reference to FIG. 5 that is a cross sectional view of V-V of FIG. 3.

The battery element BE accommodated inside the laminate sheets 101, 101' has a structure wherein positive electrodes 121, negative electrodes 122 and separators 123, each of which are disposed between the positive electrode 121 and the negative electrode 122 and also have function of electrolyte, wherein these are laminated in a sequential order, with the positive electrodes 121 being connected to the tab 107 by means of connector members 124 while the negative electrodes 122 are connected to the tab 107' by means of connector members 124'. Incidentally, the electric power generating element typically includes the positive electrodes 121, the negative electrodes 122 and the separators 123.

Positive Electrode

The positive electrode 121 has a structure that includes a positive electrode current collector, made of such as aluminum, having both surfaces on which positive electrode material is typically bonded. Positive electrode material includes various oxide compounds (involving lithium manganese oxide such as $LiMn_2O_4$, lithium nickel oxide such as $LiNiO_2$, lithium cobalt oxide such as $LiCoO_2$, lithium containing nickel cobalt oxide, and lithium containing amorphous vanadium pentoxide) and chalcogen compounds (such as titanium disulfide and molybdenum disulfide). Among these, upon consideration of a power output characteristic of the resulting lithium ion secondary battery, lithium manganese oxide or lithium nickel oxide may preferably be used.

For the purpose of increasing conductivity, conductive material may also be bonded in combination to the positive electrode current collector. Conductive material may include carbon black (such as acetylene black), nickel powder and the like.

As the positive electrode current collector, for example, expanded metal made of aluminum, a mesh made of aluminum and punched metal made of aluminum may be employed. Also, the positive electrode may take the form of a structure wherein positive electrode material is formed to one surface of the positive electrode current collector.

Negative Electrode

The negative electrode 122 has a structure that includes a negative electrode current collector, made of such as copper, having both surfaces on which negative electrode material is typically bonded. Negative electrode material may include carbon material that absorbs and liberate lithium ions. Such carbon material includes material such as natural graphite, artificial graphite, carbon black, activated carbon, carbon fibers, cokes and carbons synthesized by heat treating organic precursors (phenol resin, polyacrylonitrile, cellulose and the like) in an inactive atmosphere. Preferably, the negative electrode is comprised of amorphous carbon material. Amorphous carbon material refers to carbon material with no crystalline structure. Such amorphous carbon material is obtained by carbonizing thermosetting resin. By the way, the use of amorphous carbon material with a large voltage dependence upon discharging enables improvement in a cyclic characteristic of the lithium ion secondary battery under a state wherein more than two lithium ion secondary batteries are connected in parallel.

As the negative electrode current collector, for example, expanded metal made of copper, a mesh made of copper and punched metal made of copper may be employed. Also, the negative electrode may take the form of a structure wherein negative electrode material is formed to one surface of the negative electrode current collector.

Separator

As the separator 123, polyolefine micro-porous separator, such as polyethylene and polypropylene, may be utilized, and in the separator 123, nonaqueous electrolyte solution is immersed. Nonaqueous electrolyte solution is prepared by dissolving electrolyte in nonaqueous solvent.

Nonaqueous solvent may include such as ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulforan, acetonitrile, 1,2-dimethoxiethane, 1,3-dimethoxipropane, dimethyl ether, tetrahydrofuran (THF), and 2-methyl tetrahydrofuran. Nonaqueous solvent may be singly used or more than two kinds of nonaqueous solvents may be used in a mixed state.

Electrolyte may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and lithium bistrifluoromethylsulfnyl imide ($LiN(CF_3SO_3)_2$). The amount of electrolyte dissolved in nonaqueous solvent normally falls in a value ranging from approximately 0.2 mol/L to 2 mol/L.

Polymer that carries nonaqueous solvent may include polyethylene oxide derivative, polypropylene oxide derivative, polymers containing the above derivatives, and copolymer between vinylidenefloride (VdF) and hexafluoropropylene (HFP).

Laminate Sheet

The laminate sheets 101, 101' are used as outer sheath materials of the laminate battery 109. In general, a polymer-metal composite film is used which includes the thermally welding resin layer 105, the metallic layer 103 and the resin layer having a high rigidity in such a manner that they are laminated in this order, and also includes the thermally welding resin layer 105', the metallic layer 103' and the resin layer having a high rigidity in such a manner that they are laminated in this order. Incidentally, in FIG. 5, the resin layers having the high rigidities are omitted.

Thermally welding resin for use in the thermally welding resin layers 105, 105' includes various thermoplastic resins, such as polyethylene (PE), polypropylene (PP), polystyrene (PS), AS resin, ABS resin, polyvinyl chloride, methacrylic resin, polyethylene terephthalate, ionomer and ethylenevinylacetate (EVA). Among these, polyethylene and polypropylene are preferably used because of its excellent thermally welding capability and low cost. Moreover, more than two kinds of thermally welding resins may be used when forming a thick thermally welding resin layer on the laminate sheet as in the presently filed embodiment or when preliminarily forming a thermally welding resin layer on the tab as in a second embodiment described in detail later. However, upon consideration of degradation in sealing property at a boundary face, it is preferred for one laminate battery to employ one kind of thermally welding resin.

As the metallic layers 103, 103', an aluminum foil, nickel foil or the like may be used. As the resin having a high rigidity, polyethylene terephthalate (PET), nylon or the like may be used.

The polymer-metal composite film may take the specific structure of a laminate film, composed of plural layers which are laminated in a sequential order from an inside (facing a sealing surface) to an outside, such as a laminate film of PE/Al foil/PET; a laminate film of PE/Al foil/nylon; a laminate film of ionomer/Ni foil/PET; a laminate film of EVA/Al foil/PET; and a laminate film of ionomer/Al foil/PET. The thermally welding resin layers 105, 105' serve as sealing layers when internally accommodating the battery element BE. The metallic layers 103, 103' and the resin layer having a high rigidity afford a humidity, an anti-air-permeability and a chemical proof to outer sheath material. The laminate sheets 101, 101' can be bonded to one another in an easy and reliable manner by thermal welding.

Second Embodiment

Next, a laminate sheet, a laminate battery and a related method of a second embodiment according to the present invention are described in detail with reference to FIGS. 6 to 8B.

The presently filed embodiment is similar to the first embodiment in that the battery element, hermetically sealed in the laminate sheets composed of the thermally welding resin layers and the metallic layers, and the tabs extending from the battery element to the battery outside are employed but differs from the first embodiment in that, for the purpose of protecting the tab from being brought into contact with the metallic layer, the tab has a surface formed with a thermally welding layer. Hereinafter, description is given aiming at such a differential point, with similar structural parts being suitably described in a simplified form or omitted.

Figure 6:
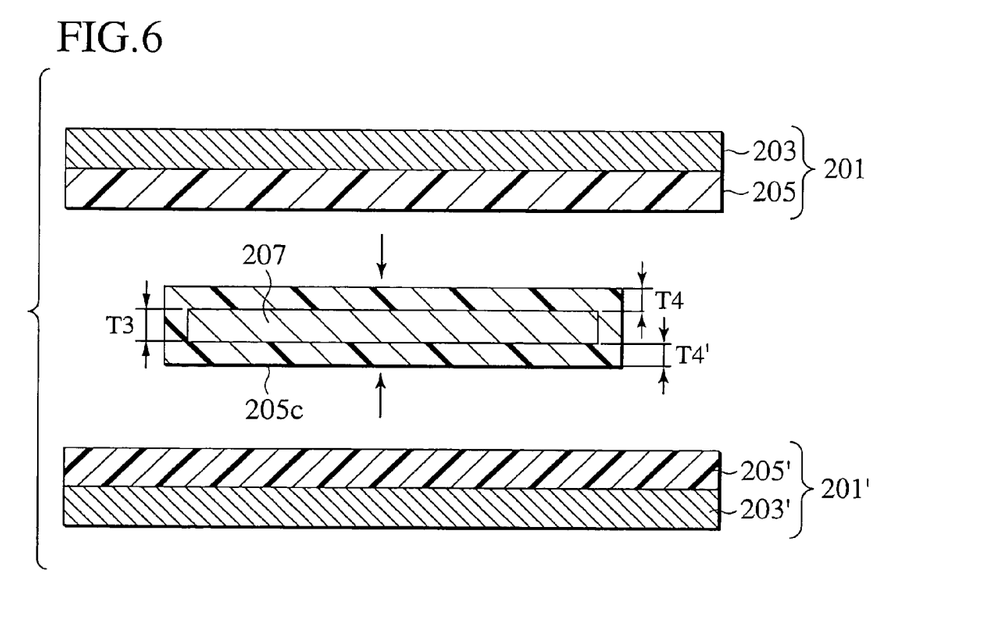
FIG. 6 is a cross sectional view illustrating a positional relationship between a laminate sheet and a tab disposed to be disposed in a laminate battery of a second embodiment according to the present invention.

FIG. 6 is a cross sectional view illustrating the positional relationship between laminate sheets 201, 201' and a tab 207 to be disposed, in the presently filed embodiment.

As shown in FIG. 6, the surface of the tab 207 is formed with a thermally welding resin layer 205c in opposition to the laminate sheets 201, 201'. Like in the first embodiment, for the purpose of permitting the thermally welding resin layer 205c to protect the metallic layers 203, 203' and the tab 107 from being brought into contact with one another, the thermally welding resin layer 205c may be preferably present at least in an area that is thermally welded through the laminate sheets 201, 201'. To this end, the thermally welding resin layer 205c is intervened in an area that is thermally welded between portions of the thermally welding resin layers 205, 205' and the tab 207. Such a configuration may be also similarly applied to the other tab.

Such a structure enables reduction in expenses for forming the thermally welding resin layers. That is, in order to vary the thickness of the thermally welding resin layers to be formed over the surfaces of the laminate sheets 201, 201', additional step is required using the press roll as shown in FIG. 4 in the first embodiment. On the contrary, as in the presently filed embodiment, the use of the thermally welding layer preliminarily formed over the tab 207 enables reduction in a manufacturing cost because of no need for the step of varying the thickness of the thermally welding resin layers to be formed over the tab surfaces. However, the thickness of the thermally welding layer to be formed over the surface of the tab 207 is not limited to a uniform thickness and may be suitably modified if desired or due to some reasons on production.

Figure 7:
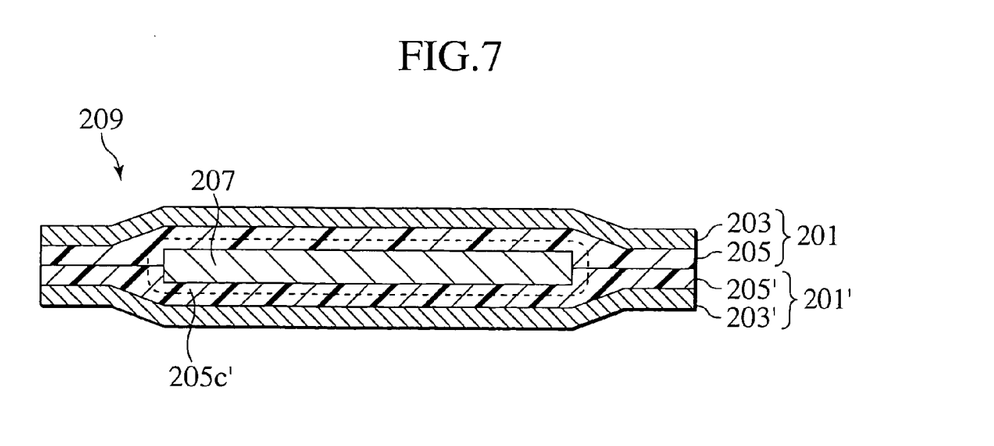
FIG. 7 is a cross sectional view of a laminate battery with the laminate sheet and the tab being thermally welded in the second embodiment and corresponds to FIG. 2.

FIG. 7 is a cross sectional view of a laminate battery 209 wherein the laminate sheets 201, 201' and the tab 207, as located in a manner as shown in FIG. 6, are thermally welded. In such a laminate battery 209, the thermally welding resin layer 205c is formed over the surface of the tab 207 that is taken out to the battery outside, and the battery element to which the tab 207 is connected is internally sealed by the laminate sheets 201, 201'. Also, for the sake of convenience of understanding, a thermally welding resin layer 205c' resulting from the thermally welding resin layer 205c preliminarily formed over the surface of the tab 207 is shown in a circle indicated by a dotted line. However, in a case where the thermally welding resin layers 205, 205' and 205c are made from the same material, the thermally welding resin layers 205, 205' and the thermally welding resin layer 205c formed over the surface of the tab 207 are integrated and no distinct boundary layer can be observed.

With such a laminate battery 209, due to the presence of the thermally welding resin layer 205c preliminarily formed over the surface of the tab 207, the laminate battery 209 formed by using thermal welding is ensured to have an adequate distance between the tab 207 and the metallic layers 203, 203'. As a result, the short-circuiting caused by contact between the tab 207 and the metallic layers 203, 203' can be prevented.

Further, with no need for the tab 207 to be reduced in thickness to a lower value less than required or not to be thinned at all, the distance between the tab 207 and the metallic layers 203, 203' can be ensured to have a sufficient length. As a result, such a laminate battery 209 is able to suppress degradation of the battery characteristic such as the increase in electrical resistance of the tab and the power output to a minimal degree.

In addition, an increase in thickness of the thermally welding resin layer occurs only in the area where the thermally welding resin layer 205c is preliminarily formed over the surface of the tab 207 and, also, an area where the tab 207 is thermally welded lies in a portion where the thickness of the laminate battery 209 is originally thinner than that of the area where the battery element is present. Therefore, almost no increase occurs in the volume of the laminate battery 209, enabling degradation of the volumetric energy density of the laminate battery 209 to be suppressed by a minimal extent. Moreover, an increased adhesive property is obtained between the tab 207 and the laminate sheets 201, 201'.

Further, the thickness T4, T4' of the thermally welding resin layer 205c formed over the surface of the tab 207 may preferably fall in a value equal to or greater than one half of the thickness T3 of the tab 207 (as expressed by $T4 \geq \frac{1}{2} \times T3$, $T4' \geq \frac{1}{2} \times T3$, with the thickness T4 of the thermally welding resin layer 205c closer to the laminate sheet 201 and the thickness T4' of the thermally welding resin layer 205c closer to the laminate sheet 201' being generally set to be equal). With the thickness falling in such a range, the metallic layers 203, 203' and the tab 207 can be sufficiently protected from being brought into contact with one another. However, the presence of an excessive increase in thickness of the thermally welding resin layer 205c formed over the surface of the tab 207 causes degradation in the volumetric energy density of the laminate battery and, in this respect, the thickness T4, T4' of the thermally welding resin layer 205c, corresponding the areas at which the tab is thermally welded, is preferably equal to or less than T3 ($T4 \leq T3$, $T4' \leq T3$).

Figure 8A:
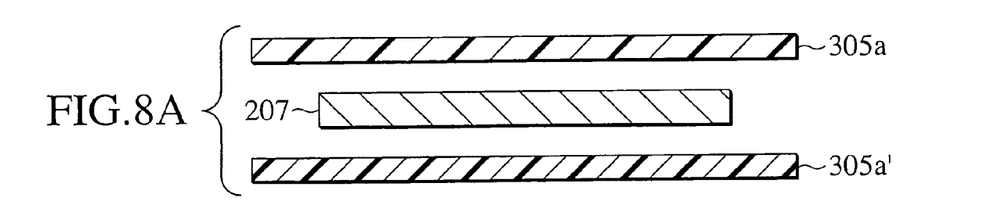
FIGS. 8A and 8B are cross sectional views of tab portions of battery elements for illustrating steps of forming a thermally welding resin layer on a tab surface of the laminate battery of the second embodiment.
Figure 8B:
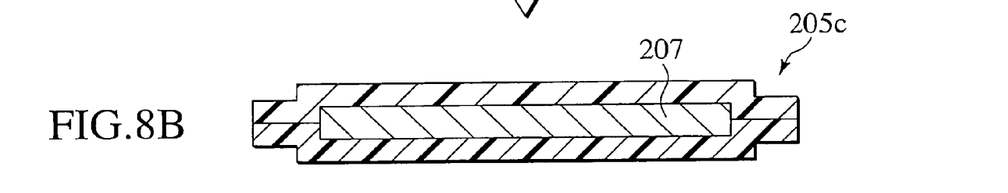

Next, a method of manufacturing the tab 207 to allow the surface thereof to be formed with the thermally welding resin layer 205c is described in conjunction with FIGS. 8A and 8B.

FIGS. 8A and 8B are cross sectional views of the tab portion for illustrating steps of forming the thermally welding resin layer 205c over the surface of the tab 207.

First, as shown in FIG. 8A, thermally welding resin layers 305a, 305a' and the tab 207 are prepared to be opposite to one another, and the thermally welding resin layers 305a, 305a' are placed over the surfaces of the tab 207. Here, places in which the thermally welding resin layers 305a, 305a' are located are determined in consideration of thermal welding to be executed for the laminate sheets. That is, especially in the longitudinal direction of the tab 297, the places of the thermally welding resin layers 305a, 305a' are determined such that the area, in which the thermally welding resin layers 305a, 305a' are located, and the area, in which the tab 207 is sandwiched by the laminate sheets, are fully thermally welded.

Then, after locating the thermally welding resin layers 305a, 305a' onto both sides of the tab 207, as shown in FIG. 8B, the thermally welding resin layers 305a, 305a' and the tab 207 are thermally welded so as to allow the tab 207 to be surrounded by the thermally welding resin layer 205c. Also, due to the circumferential length of the thermally welding resin layers 305a, 305a' being longer than an outer circumferential periphery of the tab 207, although the thermally welding resin layers 305a, 305a' have both ends formed with excess marginal portions, these excess portions may be cut out or, in some case, may be left as they are.

Furthermore, it is of course possible for the structure of the first embodiment set forth above, wherein the thermally welding resin layer 105*a* is located in the area where the tab 107 is thermally welded, and the structure of the second embodiment, which includes the tab 207 covered with the thermally welding resin layer 205*c*, to be suitably used in combination. In this connection, it may be determined such that a total thickness resulting from a sum of the incremental component of the thickness of the thermally welding resin layer 105*a* and the thickness per se of the thermally welding resin layer 205*c* is equal to or greater than one half of the thickness of the tab to which such a structure is applied and equal to or less than the same.

By the way, materials and shapes of the tab are studied hereinafter.

Materials of the tab generally include aluminum, nickel, copper and iron. Upon consideration of adhesive property of the tab with respect to the thermally welding resin layer and electrical resistance of the tab, copper and aluminum are preferably employed. And, in normal practice, it is preferred that the tab of the positive electrode and the tab of the negative electrode are formed of the same material.

However, it is conceivable that the presence of the negative electrode with the tab made from copper and aluminum makes it hard to obtain a desired corrosion resistance and, so, study is made for the use of nickel as material to form the tab of the negative electrode. Surely, by locating the tab, made from nickel, onto the negative electrode, the corrosion resistance of the tab is improved. However, if the tab, made from nickel, is located on the negative electrode, tab materials differs from one another at both electrodes and, hence, a difference occurs in heating value between the tab of the positive electrode and the tab of the negative electrode.

If the negative electrode tab is made from nickel and the positive electrode tab is made from aluminum, since nickel has a higher electric resistivity than aluminum, the presence of the tab made from aluminum and the tab made from nickel being formed in the same shape causes the tab made from nickel to have increased heating value, tending to cause degradation in a cycle characteristic of the battery. Here, if the composition of material per se is suitably adjusted, the electrical resistivity can be adjusted. However, if the composition of material per se is varied, it is probable that the adhesive property of the tab with respect to the thermally welding resin layer is degraded and costs of material per se tend to increase. Meanwhile, while it is conceived that the tab is formed in a multiple-layer structure, productivity decreases and, thus, it cannot be said that such a structure is not effective in view of mass production.

Therefore, the present inventors have found a structure which, by defining the shape of the tab, can satisfy cost-effective factors and a productivity of the battery while enhancing high adhesive property. That is, by increasing the cross sectional area of the tab, the electrical restance of the tab per se can be easily controlled.

In particular, in the laminate battery of the various embodiments set forth above, suppose that the tab of the negative electrode is made from nickel and the tab of the positive electrode is made from aluminum and x represents the cross sectional area of the negative electrode tab and y represents the cross sectional area of the positive electrode tab, it is preferable for x and y, that is, x/y (x divided y) to satisfy the following formula. Also, such cross sectional areas correspond to the cross sectional areas of the cross sections in the cross sectional views of the tabs along their extending directions, as shown in FIGS. 2 and 7.

$$1 < \frac{x}{y} \leq 2.6$$

That is, the presence of the tab made from nickel with the cross sectional area greater than the cross sectional area of the tab made from aluminum allows the heating value of the negative electrode tab to be decreased. x/y is preferably greater than 1 and, more preferably, x/y is equal to or greater than 1.5. Only in view of reduction in the heating value, the upper limit of x/y is not limited. However, the existence of excessive increase in the cross sectional area of the tab made from nickel decreases the thickness of the thermally welding resin layer, with a resultant degradation in the adhesive property of the tab. For this reason, x/y preferably falls in a value equal to or less than 2.6 and, more preferably, lies in a value equal to or less than 2.5.

Next, it is preferable for the shapes of the tabs of the positive electrode and the negative electrode to have a substantial rectangular shape with corners, in the cross sectional shape along the extending direction of the tab, being chamfered. Hereinafter, description is given with reference to FIGS. 9 and 10.

Figure 9:
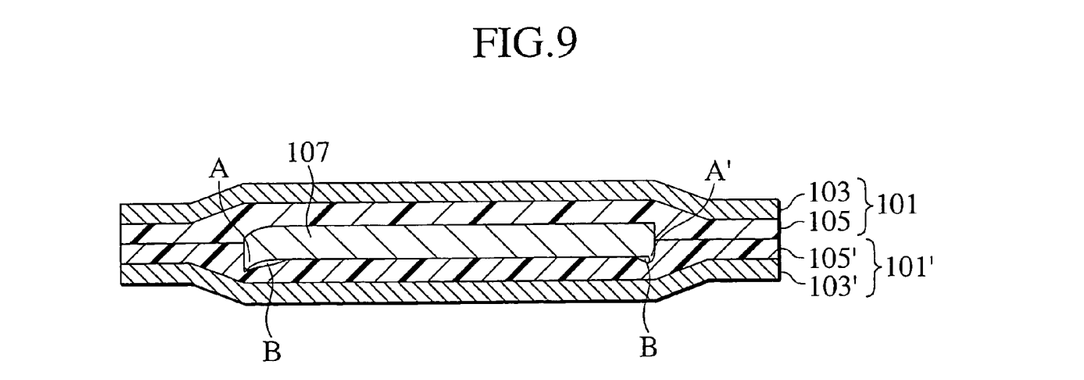
FIG. 9 is a cross sectional view of a laminate battery employing a tab with end portions thereof being formed with warps or returns which are studied in each of the embodiments according to the present invention.
Figure 10:
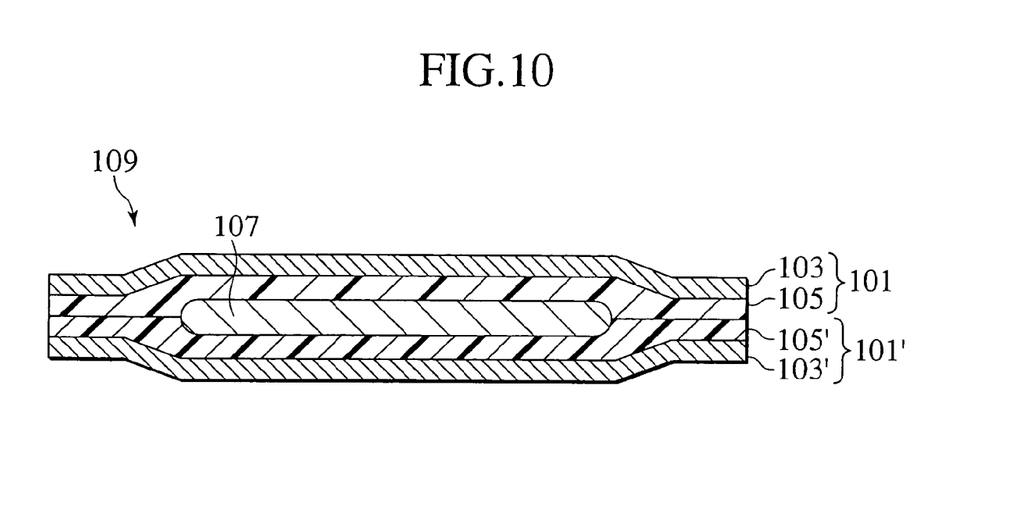
FIG. 10 is a cross sectional view of a laminate battery, employing a tab whose corners are chamfered, which can be applied to each of the embodiments according to the present invention.

FIG. 9 is a cross sectional view of a laminate battery employing tab with edge portions formed with warps or returns that have been studied in the embodiments set forth above, and FIG. 10 is a cross sectional view of a laminate battery that employs a tab with corners being chamfered and can be applied to the embodiments set forth above. Although these cross sectional views are able to correspond to FIGS. 2 and 7, respectively, a description is typically given in compliance with the structure of FIG. 2.

In general, the tab is fabricated by cutting a metal plate in a given size. Accordingly, a general shape of the tab is a rectangular parallelepiped. However, if the cross sectional shape of the tab has a fine rectangular parallelepiped, it is conceivable that there is a tendency wherein short-circuiting occurs at corner portions of the four corners and the adhesive property is degraded. Also, when cutting the tab, a probability occurs wherein the warp (as shown by A in FIG. 9) or return are formed in the tab 107 (as shown by A' in FIG. 9). The existence of the warp or return in the tab renders the thermally welding resin layer to be hard to reach the tab surface at such portions, resulting in formation of portions that are so called as pores, (as shown at B in the figure). As a result, degradation occurs in the adhesive property between the tab and the thermally welding resin layer. Also, in FIG. 9, the warp or return is illustrated in exaggeration for the sake of convenience of description.

Thus, as shown in FIG. 10, the corners of the tab are previously chamfered into a rounded edge before heat welding, no rectangular corner per se exists and it is hard for the pores to be formed. Of course, the cross sectional shape of such a tab is not particularly limited and may take the form of not only the shape which is elliptical or in which only corners are chamfered but also a polygon shape such as a rhombus or two trapezoids which are joined such that the long sides thereof are faced to one another.

Figure 11:
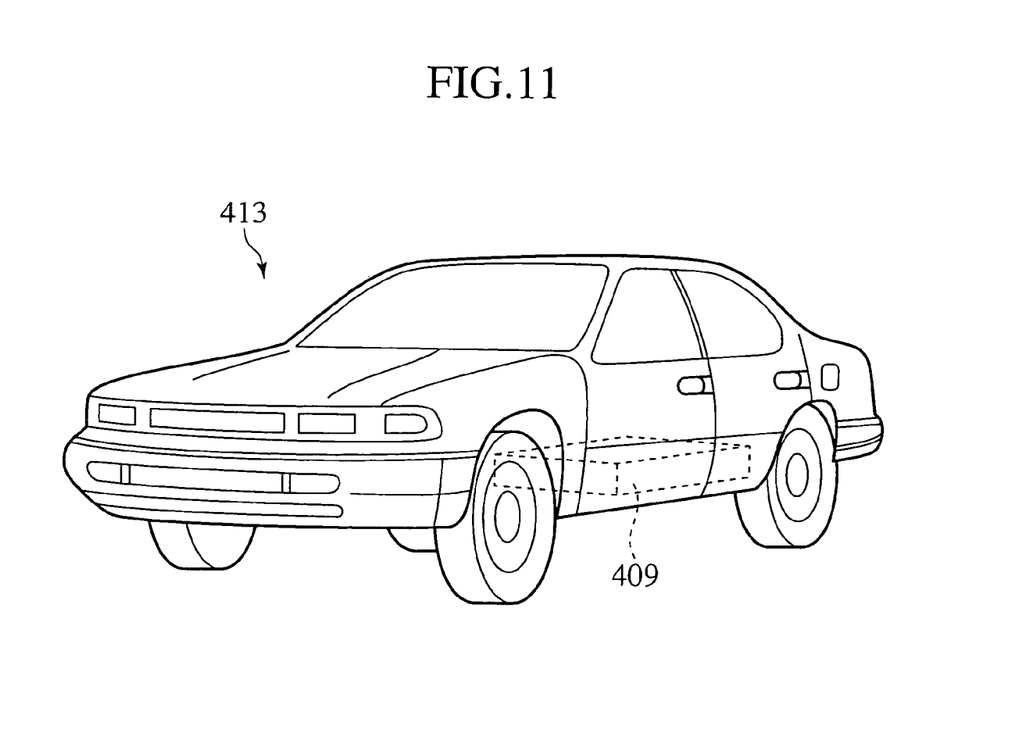
FIG. 11 is a perspective view of a vehicle in which a battery module is installed that is comprised of a plurality of the laminate batteries described in each of the embodiments according to the present invention.

Further, a battery module wherein a plurality of the laminate batteries of the embodiments set forth above are suitably connected in series, in parallel or in combination of these connections may be installed on a vehicle (an automobile) 413 as shown in FIG. 11.

As shown in FIG. 11, the battery module 409 installed in the vehicle 413 has a high sealing property and additionally has a high volumetric energy density. Since the vehicle is normally used for a long period of time over several years and additionally exposed to vibrations at all times, the presence of such a high sealing property contributes to an improvement in a reliability of the vehicle.

Hereinafter, various examples in which more concrete tab shapes of the embodiments of the present invention set forth above have been studied are described. For the purpose of evaluating the heating value and the reliability of the laminate battery employing the negative electrode tab made from nickel and the positive electrode tab made from aluminum, the laminate batteries 1 to 8 were fabricated. Also, although the method of manufacturing the tabs of the various embodiments adopted the method in the first embodiment, it is of course not objectionable for the method of the second embodiment to be adopted.

EXAMPLE 1

In this Example, the laminate battery 1 was obtained wherein, suppose that x is the cross sectional area of the negative electrode tab and y represents the cross sectional area of the positive electrode tab, x and y have the relationship of $x/y=1.1$.

That is, a nickel plate with a thickness of 0.11 mm and a width of 44 mm was prepared as the negative electrode tab. The cross sectional area of the nickel plate was 4.84 $mm^2$. An aluminum plate with a thickness of 0.10 mm and a width of 44 mm was prepared as the positive electrode tab. The cross sectional area of the aluminum plate was 4.40 $mm^2$.

Using these tabs, the laminate battery 1 was prepared which accommodated therein the battery element in an area of 140 mm×75 mm. The tabs were disposed in layout so as to protrude in a length of 24 mm from a point at which the laminate sheet exists.

Using this battery, cycles of "discharging at a rate of 30 C for five seconds and halt for one minute" were repeatedly conducted ten times at a room temperature (25° C.). Upon measurement of the temperature of the nickel tab after having conducted repeated cycles ten times, the temperature of the nickel tab raised to 29° C.

Further, one hundred pieces of similar laminate batteries were fabricated with litmus papers being adhered to the nickel tabs, respectively. There was one piece of laminate battery whose litmus paper was discolored due to leakage of liquid. The thickness of the tabs, x/y and evaluations are summarized in the following Table 1.

EXAMPLE 2

In this Example, the laminate battery 2 was obtained wherein, suppose that x is the cross sectional area of the negative electrode tab and y represents the cross sectional area of the positive electrode tab, x and y have the relationship of $x/y=1.5$.

That is, the laminate battery 2 was obtained in the same manufacturing method as that of the laminate battery 1 except for that the thickness of the tab made from nickel was 0.15 mm and the cross sectional area of the tab made from nickel was 6.60 $mm^2$. Evaluation was conducted for the laminate battery 2 in the same way as that of the laminate battery 1.

In this Example, the temperature of the nickel tab was 28° C., and there were two pieces of laminate batteries whose litmus papers were discolored. The thickness of the tabs, x/y and evaluations are summarized in the following Table 1.

EXAMPLE 3

In this Example, the laminate battery 3 was obtained wherein, suppose that x is the cross sectional area of the negative electrode tab and y represents the cross sectional area of the positive electrode tab, x and y have the relationship of $x/y=1.7$.

That is, the laminate battery 3 was obtained in the same manufacturing method as that of the laminate battery 1 except for that the thickness of the tab made from nickel was 0.17 mm and the cross sectional area of the tab made from nickel was 7.48 $mm^2$. Evaluation was conducted for the laminate battery 3 in the same way as that of the laminate battery 1.

In this Example, the temperature of the nickel tab was 26° C., and there were two pieces of laminate batteries whose litmus papers were discolored. The thickness of the tabs, x/y and evaluations are summarized in the following Table 1.

EXAMPLE 4

In this Example, the laminate battery 4 was obtained wherein, suppose that x is the cross sectional area of the negative electrode tab and y represents the cross sectional area of the positive electrode tab, x and y have the relationship of $x/y=2.0$.

That is, the laminate battery 3 was obtained in the same manufacturing method as that of the laminate battery 1 except for that the thickness of the tab made from nickel was 0.2 mm and the cross sectional area of the tab made from nickel was 8.80 $mm^2$. Evaluation was conducted for the laminate batteries 4 in the same way as that of the laminate battery 1.

In this Example, the temperature of the nickel tab was 27° C., and there were three pieces of laminate batteries whose litmus papers were discolored. The thickness of the tabs, x/y and evaluations are summarized in the following Table 1.

EXAMPLE 5

In this Example, the laminate battery 5 was obtained wherein, suppose that x is the cross sectional area of the negative electrode tab and y represents the cross sectional area of the positive electrode tab, x and y have the relationship of $x/y=2.4$.

That is, the laminate battery 3 was obtained in the same manufacturing method as that of the laminate battery 1 except for that the thickness of the tab made from nickel was 0.24 mm and the cross sectional area of the tab made from nickel was 10.56 $mm^2$. Evaluation was conducted for the laminate battery 5 in the same way as that of the laminate battery 1.

In this Example, the temperature of the nickel tab was 26° C., and there were two pieces of laminate batteries whose litmus papers were discolored. The thickness of the tabs, x/y and evaluations are summarized in the following Table 1.

EXAMPLE 6

In this Example, the laminate battery 6 was obtained wherein, suppose that x is the cross sectional area of the negative electrode tab and y represents the cross sectional area of the positive electrode tab, x and y have the relationship of $x/y=2.6$.

That is, the laminate battery 3 was obtained in the same manufacturing method as that of the laminate battery 1 except for that the thickness of the tab made from nickel was 0.26 mm and the cross sectional area of the tab made from nickel was 11.44 mm². Evaluation was conducted for the laminate battery 6 in the same way as that of the laminate battery 1.

In this Example, the temperature of the nickel tab was 25° C., and there were four pieces of laminate batteries whose litmus papers were discolored. The thickness of the tabs, x/y and evaluations are summarized in the following Table 1.

EXAMPLE 7

In this Example, the laminate battery 7 was obtained wherein, suppose that x is the cross sectional area of the negative electrode tab and y represents the cross sectional area of the positive electrode tab, x and y have the relationship of x/y=1.0.

That is, the laminate battery 3 was obtained in the same manufacturing method as that of the laminate battery 1 except for that the thickness of the tab made from nickel was 0.10 mm and the cross sectional area of the tab made from nickel was 4.40 mm². Evaluation was conducted for the laminate battery 7 in the same way as that of the laminate batteries 1.

In this Example, the temperature of the nickel tab was 40° C., and there was zero piece of laminate batteries whose litmus papers were discolored. The thickness of the tabs, x/y and evaluations are summarized in the following Table 1.

EXAMPLE 8

In this Example, the laminate battery 8 was obtained wherein, suppose that x is the cross sectional area of the negative electrode tab and y represents the cross sectional area of the positive electrode tab, x and y have the relationship of x/y=2.7.

That is, the laminate battery 3 was obtained in the same manufacturing method as that of the laminate battery 1 except for that the thickness of the tab made from nickel was 0.27 mm and the cross sectional area of the tab made from nickel was 11.88 mm². Evaluation was conducted for the laminate battery 8 in the same way as that of the laminate batteries 1.

In this Example, the temperature of the nickel tab was 25° C., and there were ten pieces of laminate batteries whose litmus papers were discolored. The thickness of the tabs, x/y and evaluations are summarized in the following Table 1.

TABLE 1

| Battery | Thickness of Ni Tab (mm) | Cross Sectional Area x of Ni Tab (mm²) | Thickness of Al Tab (mm) | Cross Sectional Area y of Al Tab (mm²) | x/y | Temp of Ni Tab (° C.) | Number of Batteries with leakage of liquid |
|---|---|---|---|---|---|---|---|
| 1 | 0.11 | 4.84 | 0.10 | 4.40 | 1.1 | 29 | 1 |
| 2 | 0.15 | 6.60 | 0.10 | 4.40 | 1.5 | 28 | 0 |
| 3 | 0.17 | 7.48 | 0.10 | 4.40 | 1.7 | 26 | 2 |
| 4 | 0.20 | 8.80 | 0.10 | 4.40 | 2.0 | 27 | 3 |
| 5 | 0.24 | 10.56 | 0.10 | 4.40 | 2.4 | 26 | 2 |
| 6 | 0.26 | 11.44 | 0.10 | 4.40 | 2.6 | 25 | 4 |
| 7 | 0.10 | 4.4 | 0.10 | 4.40 | 1.0 | 40 | 0 |
| 8 | 0.27 | 11.88 | 0.10 | 4.40 | 2.7 | 25 | 10 |

As understood from Table 1, it is understood that if a value of (cross sectional surface area of nickel tab x)/(cross sectional surface area of aluminum tab y) is greater than 1.0 and equal to or less than 2.6, the heating value occurred in each nickel tab is in a allowable level since the temperatures of the nickel tabs were maintained in a range between 25° C. and 29° C. regarding the batteries 1 to 6, and the leakage of liquid from each battery is in a allowable level since the number of the batteries from which the liquid was leaked was maintained in a range between 0 to 4 regarding the batteries 1 to 6. Incidentally, regarding the battery 7, the temperature 40° C. of the nickel tab was significantly higher than the other batteries, and regarding the battery 8, the number 10 of the batteries from which the liquid was leaked was significantly larger than the other batteries.

From the foregoing description, with the structure of the present invention, the laminate sheet is formed in a configuration to allow the thermally welding resin layer, corresponding to the area wherein the tab is placed in a future, to be preliminarily thickened. For this reason, even in a case where the tab is sandwiched between the two sheets of laminate sheets and thermally welded, an adequate distance can be enhanced between the tab and the metallic layers existing in the laminate sheets, thereby enabling short-circuiting due to contact between the tab and the metallic layers to be effectively protected. Also, increased adhesive property can be provided between the tab and the laminate sheets and, in addition, degradation in the battery characteristic of the laminate battery can be suppressed by a minimal extent.

Further, with the structure of the present invention, the thermally welding resin layer is preliminarily formed over the tab surface at an area corresponding to a portion which is thermally welded by means of the laminate sheets in the future. For this reason, even in a case where the tab is sandwiched between the two sheets of laminate sheets and thermally welded, an adequate distance can be enhanced between the tab and the metallic layers existing in the laminate sheets, thereby enabling shirt circuiting due to contact between the tab and the metallic layers to be effectively protected. Also, increased adhesive property can be provided between the tab and the laminate sheets and, in addition, degradation in the battery characteristic of the laminate battery can be suppressed by a minimal extent.

The entire content of a Patent Application No. TOKUGAN 2002-281355 with a filing date of Sep. 26, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A battery element internally sealed in a laminate sheet provided with a thermally welding resin layer and a metallic layer laminated thereon, comprising:
   an electric power generating element;
   a first tab extending out from the laminate sheet; and
   a second tab extending out from the laminate sheet in a direction opposite to the first tab, the first and second tabs to be formed with a thermally welding resin layer which is thermally welded with a thermally welding resin layer of the laminate sheet and connected to the electric power generating element with an amount of resin allowing an amount of resin, to be pushed outside the tabs, to be compensated.

2. The battery element according to claim 1, wherein a thickness of the thermally welding resin layer is determined to be a value equal to or greater than one half of the thickness of the tab.

3. A laminate battery comprising:
a first tab;
a second tab;
an electric power generating element connected to the first and second tabs; and
a laminate sheet allowing the electric power generating element to be accommodated and having:
a metallic layer; and
a thermally welding resin layer laminated on the metallic layer,
wherein the first tab extends out from the laminate sheet in a direction opposite to the first tab, such that the first and second tabs and the thermally welding resin layer are welded by permitting a thermally welding area, which is formed in at least one of the thermally welding resin layer and the tabs, and the other of the thermally welding resin layer and the tabs to be welded to one another with an amount of resin allowing an amount of resin, to be pushed outside the tabs, to be compensated.

4. The laminate battery according to claim 3, wherein the thermally welding area is composed of thermally welding resin and integrally formed with the thermally welding resin layer such that the thermally welding area corresponds to a partial area, to which the tab is thermally welded, of a portion to be thermally welded, of the thermally welding resin layer.

5. The laminate battery according to claim 4, wherein a thickness of the thermally welding area of the thermally welding resin layer is determined to be larger than a thickness of a remaining area of the portion to be thermally welded by a value equal to or greater than one half of the thickness of the tab.

6. The laminate battery according to claim 5, wherein a thickness of the thermally welding area of the thermally welding resin layer is determined to be larger than the thickness of the remaining area of the portion to be thermally welded within a range equal to or less than the thickness of the tab.

7. The laminate battery according to claim 3, wherein the thermally welding area is composed of thermally welding resin and integrally formed with the tab.

8. The laminate battery according to claim 7, wherein a thickness of the thermally welding area is determined to be equal to or larger than one half of the thickness of the tab.

9. The laminate battery according to claim 8, wherein the thickness of the thermally welding area is determined to be equal to or less than the thickness of the tab.

10. The laminate battery according to claim 3, wherein the tab includes a negative electrode tab composed of nickel and a positive electrode tab composed of aluminum and wherein, suppose that x represents a cross sectional area of the negative electrode tab and y represents a cross sectional area of the positive electrode tab, x and y satisfy the following formula:

$$1 < \frac{x}{y} \leq 2.6.$$

11. The laminate battery according to claim 3, wherein the laminate battery is installed on a vehicle as a battery module.

12. A method of manufacturing a laminate battery, comprising:
preparing first and second tabs and an electric power generating element connected to the tabs;
preparing a laminate sheet having a metallic layer and a thermally welding resin layer laminated on the metallic layer; and
welding the tabs, which extend out from the laminate sheet in opposite directions, and the thermally welding resin layer, such that a thermally welding area formed in at least one of the thermally welding layer and the tabs are welded to the other of the thermally welding layer and the tabs with an amount of resin allowing an amount of resin, to be pushed outside the tabs, to be compensated, while permitting the electric power generating element to be accommodated in the laminate sheet.

* * * * *